United States Patent
Wang

(10) Patent No.: US 9,297,298 B2
(45) Date of Patent: Mar. 29, 2016

(54) DUAL WASTEGATE ACTUATION

(71) Applicant: Ford Global Technologies, LLC, Dearborn, MI (US)

(72) Inventor: Yan Wang, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/217,024

(22) Filed: Mar. 17, 2014

(65) Prior Publication Data

US 2015/0260086 A1    Sep. 17, 2015

(51) Int. Cl.
| | |
|---|---|
| F02D 23/00 | (2006.01) |
| F02B 33/44 | (2006.01) |
| F02B 33/00 | (2006.01) |
| F02B 37/18 | (2006.01) |
| F02B 37/12 | (2006.01) |
| F02B 29/04 | (2006.01) |
| F02B 37/007 | (2006.01) |

(52) U.S. Cl.
CPC ............ *F02B 37/186* (2013.01); *F02B 29/0406* (2013.01); *F02B 37/007* (2013.01); *F02B 37/12* (2013.01); *F02B 37/18* (2013.01); *F02B 37/183* (2013.01)

(58) Field of Classification Search
CPC ...... F02B 37/004; F02B 37/18; F02B 37/013; F16L 37/56; F16K 1/24; F16K 31/44
USPC .......... 60/602, 612, 605.1; 123/562; 137/595; 251/279, 280
See application file for complete search history.

(56) References Cited

U.S. PATENT DOCUMENTS

| | | | | | |
|---|---|---|---|---|---|
| 2,199,259 | A | * | 4/1940 | Hersey | 60/602 |
| 2,359,615 | A | * | 10/1944 | Browne et al. | 60/602 |
| 3,365,965 | A | * | 1/1968 | French | 137/595 |
| 4,785,626 | A | * | 11/1988 | Shiraishi | 60/313 |
| 4,794,758 | A | * | 1/1989 | Nakazawa et al. | 60/602 |
| 5,046,317 | A | * | 9/1991 | Satokawa | 60/602 |
| 5,427,141 | A | * | 6/1995 | Ohtsubo | 137/595 |
| 5,996,348 | A | | 12/1999 | Watkins | |
| 6,134,888 | A | | 10/2000 | Zimmer et al. | |
| 7,076,955 | B2 | * | 7/2006 | Herz et al. | 60/612 |
| 7,121,088 | B2 | * | 10/2006 | Lavin | 137/595 |
| 7,814,748 | B2 | * | 10/2010 | Nydam et al. | 137/595 |
| 8,196,403 | B2 | | 6/2012 | Hittle et al. | |
| 2009/0151352 | A1 | * | 6/2009 | McEwan et al. | 60/602 |
| 2012/0222419 | A1 | | 9/2012 | Hittle et al. | |
| 2014/0322046 | A1 | * | 10/2014 | Yamaguchi et al. | 417/405 |

FOREIGN PATENT DOCUMENTS

| | | | | |
|---|---|---|---|---|
| DE | 19853392 A1 * | 5/2000 | | F02B 37/18 |
| WO | WO 9841744 A1 * | 9/1998 | | F02B 37/18 |

* cited by examiner

*Primary Examiner* — Thai Ba Trieu
*Assistant Examiner* — Ngoc T Nguyen
(74) *Attorney, Agent, or Firm* — Julia Voutyras; Alleman Hall McCoy Russell & Tuttle LLP

(57) ABSTRACT

Various systems and methods for controlling dual wastegates via a single wastegate actuator are provided. In one example, a system comprises a first wastegate comprising a first wastegate valve, a second wastegate comprising a second wastegate valve, and a wastegate actuator coupled to each of the first and second wastegate valves to vary openings of the first wastegate valve and the second wastegate valve according to desired boost.

18 Claims, 4 Drawing Sheets

DUAL WASTEGATE ACTUATION

FIELD

The field of the disclosure relates to control of dual wastegates in an internal combustion engine.

BACKGROUND AND SUMMARY

Some internal combustion engines utilize a compression device such as a turbocharger to increase engine torque/power output density. In one example, a turbocharger may include a compressor and a turbine connected by a drive shaft, with the turbine being coupled to an exhaust manifold side of an engine and the compressor being coupled to an intake manifold side of the engine. In this way, the exhaust-driven turbine supplies energy to the compressor to increase the pressure (e.g. boost, or boost pressure) in the intake manifold and to increase the flow of air into the engine. Some engines, such as V-engines, utilize twin turbochargers each positioned on respective intake/exhaust sides and configured to increase the boost pressure delivered to respective cylinder banks. In some configurations, each turbocharger may include a wastegate to control the amount of gas reaching an associated turbine and thus the boost pressure delivered to the associated cylinder bank. Each wastegate may in turn be operatively coupled to an actuator configured to position a wastegate valve between a fully open and a fully closed position to achieve a desired boost. The actuators may be pneumatic, hydraulic, or electric, for example. Thus, in such twin turbocharger configurations two wastegates are each controlled by an associated actuator.

The inventors herein have recognized several issues with such approaches. In particular, v-engine asymmetries between cylinder banks, resulting from differences in exhaust system routing, exhaust manifold design, turbine housing casting design, and/or wastegate passage design, may create imbalances in positioning between the wastegates and thus the boost pressure delivered to each cylinder bank. Manufacturing variability and hysteresis within the actuators may further exacerbate asymmetry between the cylinder banks. As such, additional complexity may be introduced to wastegate control routines in order to compensate such asymmetry. Moreover, dual wastegate actuators increase cost and part count relative to configurations in which a single wastegate having an associated actuator is used.

Systems and methods for controlling dual wastegates via a single wastegate actuator are thus provided.

In one example, a system comprises a first wastegate comprising a first wastegate valve, a second wastegate comprising a second wastegate valve, and a wastegate actuator coupled to each of the first and second wastegate valves to vary openings of the first wastegate valve and the second wastegate valve according to desired boost.

In a more specific example, the first wastegate valve and the second wastegate valve are coupled to the wastegate actuator through a variable-length arm via respective linkages, the wastegate actuator being configured to vary a length of the variable-length arm.

In another aspect of the example, the first wastegate valve and the second wastegate valve are coupled to the wastegate actuator through respective plates via respective linkages, the respective plates disposed being inside a reservoir, the reservoir being configured such that increased fluidic pressure supplied to the reservoir pushes the respective plates outwardly, decreasing respective lifts of the first wastegate valve and the second wastegate valve, the reservoir being configured such that decreased fluidic pressure supplied to the reservoir brings the plates closer together, increasing the respective lifts of the first wastegate valve and the second wastegate valve.

In still another aspect of the example, the reservoir is configured to receive a hydraulic fluid from a hydraulic regulator via tubing, the hydraulic regulator fluidically coupled to a hydraulic fluid source.

In yet another aspect of the example, the reservoir is configured to receive pressurized gasses from a vacuum regulator via tubing, the vacuum regulator fluidically coupled to a vacuum source.

In the examples described above, control of dual wastegates may be facilitated via a single wastegate actuator at reduced part count, cost, and control routine complexity. Thus, the technical result is achieved by these actions.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

As described above, some internal combustion engines may utilize a compression device such as a turbocharger to increase the pressure supplied to cylinders of the engine to thereby increase engine output. To in part control the level of boost pressure supplied to the cylinders, the turbocharger may include a wastegate that may be operated to selectively divert exhaust gasses from reaching a turbine of the turbocharger. In V-engines, turbochargers each having an associated wastegate may be disposed on each cylinder bank. Thus in such configurations dual turbochargers and dual wastegates are used to control boost. However, complex control routines may be used to balance the wastegates, as asymmetric boost levels between the cylinder banks may result from various factors including differences in exhaust system routing, exhaust manifold design, turbine housing casting design, wastegate passage design, manufacturing variability, and wastegate actuator hysteresis. Moreover, imbalance between the cylinder banks may be perceived as noise, vibration, and harshness (NVH).

Figure 1:
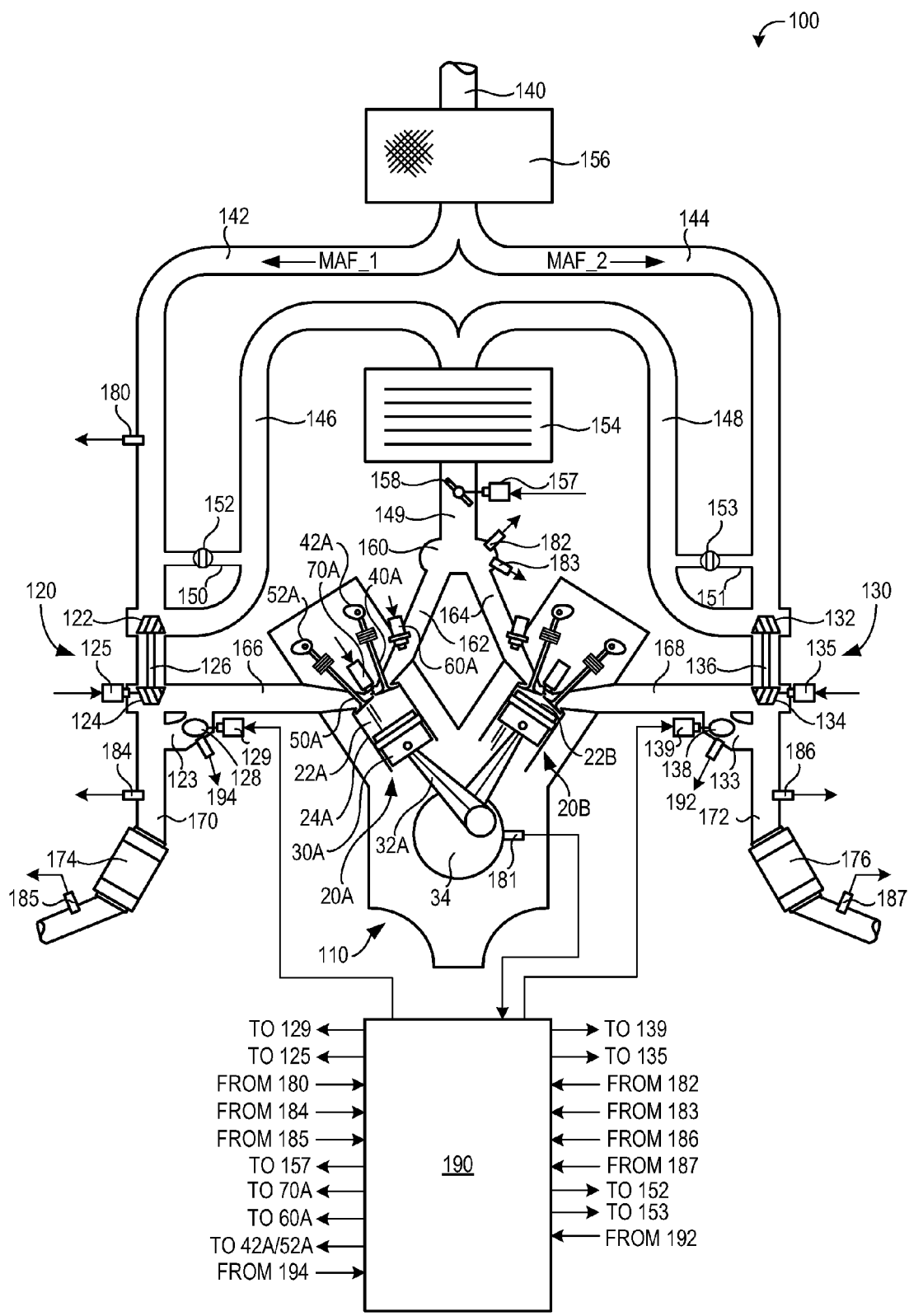
FIG. 1 shows a schematic depiction of an example engine system.
Figure 2:
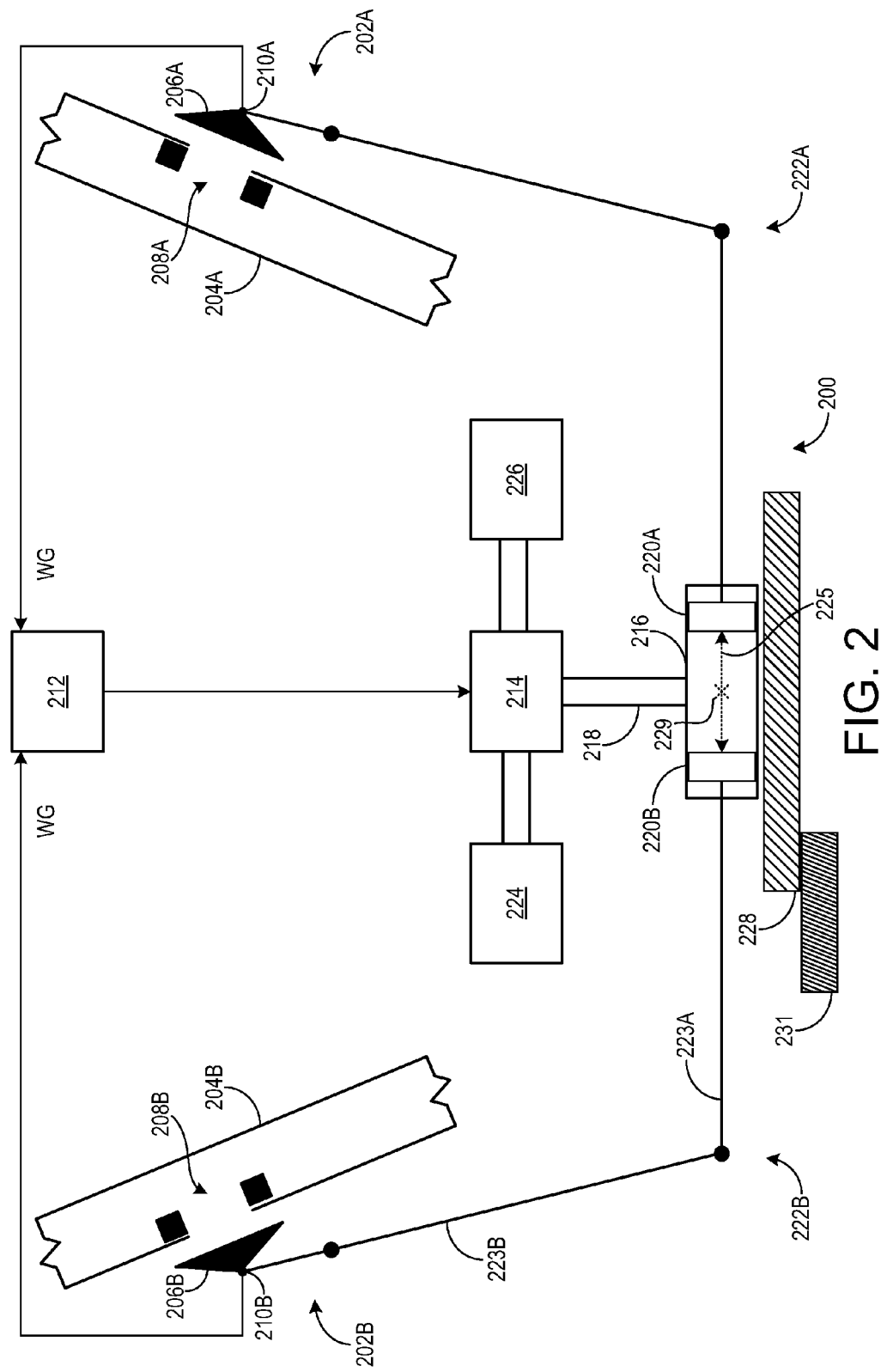
FIG. 2 shows a schematic depiction of an example dual wastegate system.
Figure 3A:
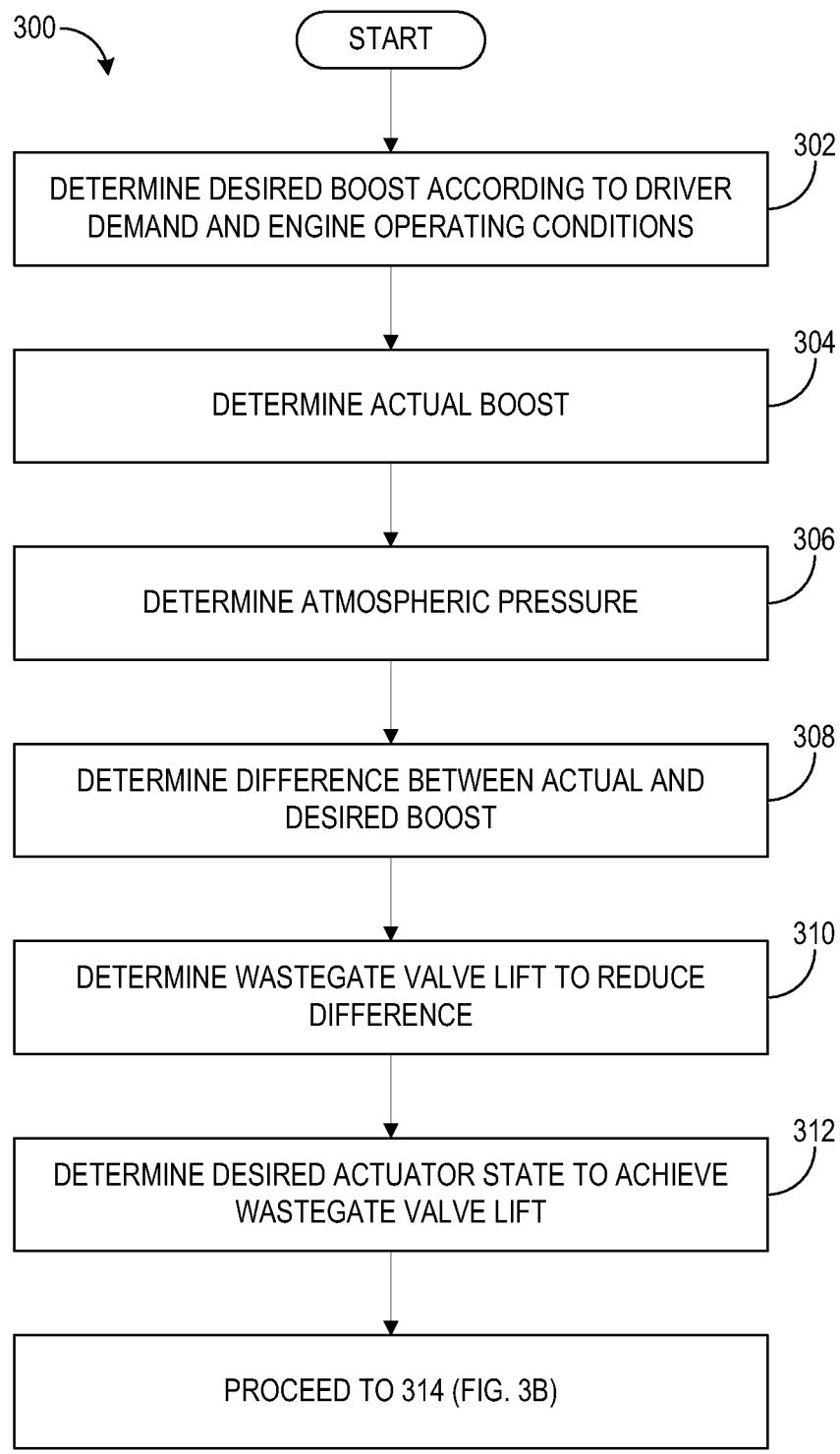
FIGS. 3A & 3B show a flowchart illustrating a method for controlling a turbocharger associated with the twin wastegate system of FIG. 2.
Figure 3B:
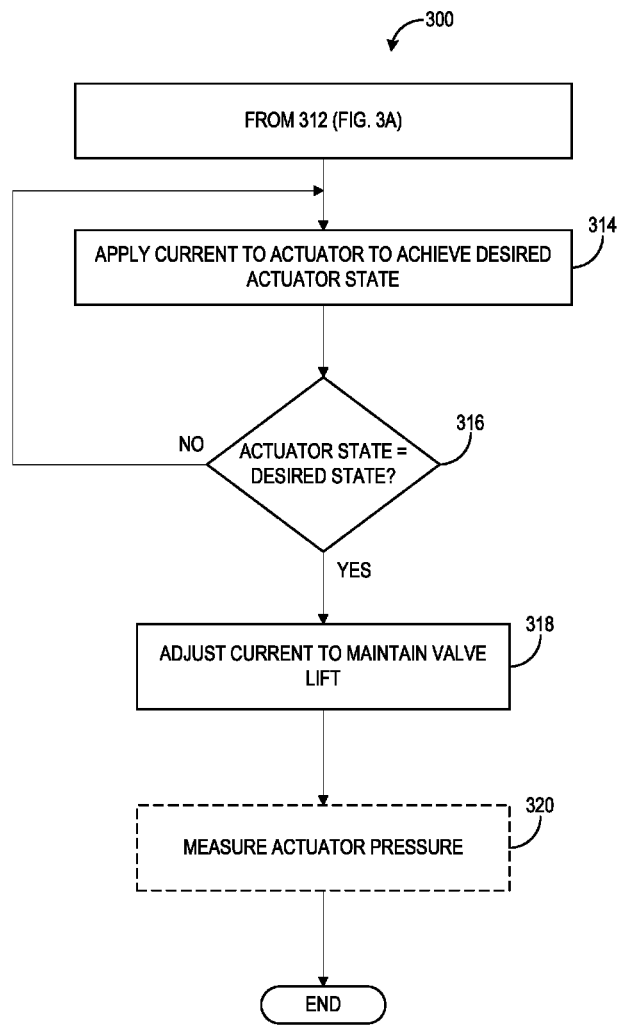

Various systems for controlling dual wastegates via a single wastegate actuator are thus provided. In one example, a system comprises a first wastegate comprising a first wastegate valve, a second wastegate comprising a second wastegate valve, and a wastegate actuator coupled to each of the first and second wastegate valves to vary openings of the first wastegate valve and the second wastegate valve according to desired boost. FIG. 1 shows a schematic depiction of an example engine system, FIG. 2 shows a schematic depiction of an example dual wastegate system, and FIGS. 3A & 3B show a flowchart illustrating a method for controlling a turbocharger associated with the twin wastegate system of FIG. 2.

FIG. 1 shows a schematic depiction of an example engine system 100 including a multi-cylinder internal combustion engine 110 and twin turbochargers 120 and 130. As one non-limiting example, engine system 100 can be included as part of a propulsion system for a passenger vehicle. Engine system 100 can receive intake air via intake passage 140. Intake passage 140 can include an air filter 156. At least a portion of the intake air (MAF_1) can be directed to a compressor 122 of turbocharger 120 via a first branch of the intake passage 140 as indicated at 142 and at least a portion of the intake air (MAF_2) can be directed to a compressor 132 of turbocharger 130 via a second branch of the intake passage 140 as indicated at 144.

The first portion of the total intake air (MAF_1) can be compressed via compressor 122 where it may be supplied to intake manifold 160 via intake air passage 146. Thus, intake passages 142 and 146 form a first branch of the engine's air intake system. Similarly, a second portion of the total intake air (MAF_2) can be compressed via compressor 132 where it may be supplied to intake manifold 160 via intake air passage 148. Thus, intake passages 144 and 148 form a second branch of the engine's air intake system. As shown in FIG. 1, intake air from intake passages 146 and 148 can be recombined via a common intake passage 149 before reaching intake manifold 160, where the intake air may be provided to the engine. In some examples, intake manifold 160 may include an intake manifold pressure sensor 182 and/or an intake manifold temperature sensor 183, each communicating with control system 190. Intake passage 149 can include an air cooler 154 and/or a throttle 158. The position of the throttle can be adjusted by the control system via a throttle actuator 157 communicatively coupled to control system 190. As shown in FIG. 1, a first compressor recirculation valve (CRV1) 152 and a second compressor recirculation valve (CRV2) 153 may be provided to selectively recirculate intake air around the compressor stages of turbochargers 120 and 130 via recirculation passages 150, 151.

Engine 110 may include a plurality of cylinders two of which are shown in FIG. 1 as 20A and 20B. Note that in some examples, engine 110 can include more than two cylinders such as 3, 4, 5, 6, 8, 10 or more cylinders. These various cylinders can be equally divided and arranged in a vee configuration in-line with one of cylinders 20A and 20B. Cylinders 20A and 20B among other cylinders of the engine may be identical in some examples and include identical components. As such, only cylinder 20A will be described in detail. Cylinder 20A includes a combustion chamber 22A defined by combustion chamber walls 24A. A piston 30A is disposed within combustion chamber 22A and is coupled to a crank shaft 34 via a crank arm 32A. Crank shaft 34 may include an engine speed sensor 181 that can identify the rotational speed of crank shaft 34. Engine speed sensor 181 can communicate with control system 190 to enable a determination of engine speed. Cylinder 20A can include a spark plug 70A for delivering an ignition spark to combustion chamber 22A. However, in some examples, spark plug 70A may be omitted, for example, where engine 110 is configured to provide combustion via compression ignition. Combustion chamber 22A may include a fuel injector 60A, which in this example is configured as a port based fuel injector. However, in other examples, fuel injector 60A can be configured as a direct in-cylinder injector.

Cylinder 20A can further include at least one intake valve 40A actuated via an intake valve actuator 42A and at least one exhaust valve 50A actuated via an exhaust valve actuator 52A. Cylinder 20A can include two or more intake valves and/or two or more exhaust valves along with associated valve actuators. In this particular example, actuators 42A and 52A are configured as cam actuators, however, in other examples, electromagnetic valve actuators (EVA) may be utilized. Intake valve actuator 42A can be operated to open and close intake valve 40A to admit intake air into combustion chamber 22A via intake passage 162 communicating with intake manifold 160. Similarly, exhaust valve actuator 52A can be operated to open and close exhaust valve 50A to exhaust products of combustion from combustion chamber 22A into exhaust passage 166. In this way, intake air may be supplied to combustion chamber 22A via intake passage 162 and products of combustion may be exhausted from combustion chamber 22A via exhaust passage 166.

It should be appreciated that cylinder 20B or other cylinders of engine 110 can include the same or similar components of cylinder 20A as described above. Thus, intake air may be supplied to combustion chamber 22B via intake passage 164 and products of combustion may be exhausted from combustion chamber 22B via exhaust passage 168. Note that in some examples a first bank of cylinders of engine 110 including cylinder 20A as well as other cylinders can exhaust products of combustion via a common exhaust passage 166 and a second bank of cylinders including cylinder 20B as well as other cylinders can exhaust products of combustion via a common exhaust passage 168.

Products of combustion that are exhausted by engine 110 via exhaust passage 166 can be directed through exhaust turbine 124 of turbocharger 120, which in turn can provide mechanical work to compressor 122 via shaft 126 in order to provide compression to intake air as described above. Alternatively, some or all of the exhaust gases flowing through exhaust passage 166 can bypass turbine 124 via turbine bypass passage 123 as controlled by wastegate 128. The position of wastegate 128 may be controlled by actuator 129 as directed by control system 190. In some embodiments, actuator 129 may be a pneumatic (or hydraulic, as described below) actuator configured to vary the pressure with which a wastegate valve (not shown) of wastegate 128 is acted against. By varying this pressure, and thus the force applied to the wastegate valve, the position of the wastegate valve may be selectively positioned (e.g., continuously between a fully open and a fully closed position) to control the level of gas diversion away from turbine 124 and thus the boost delivered to cylinder 20A and other cylinders in an associated bank. In this configuration, actuator 129 may include a suitable vacuum source (not shown), and optionally a vent (not shown) with which gases may be exhausted when the wastegate valve is not placed at the fully closed position. An exemplary pneumatic wastegate configuration is shown in FIG. 2 and described below.

In other embodiments, actuator 129 may be an electric motor having an output shaft coupled to a linkage (e.g., four bar, linear rod, etc.) to which the wastegate valve of wastegate 128 is also coupled. In yet other embodiments, a solenoid may be used to control the position of the wastegate valve.

A sensor 194 may be positioned on or near turbocharger 120. In one example, sensor 194 may detect turbine speed. In another example, sensor 194 may detect a position of wastegate 128. For example, one or more of a wastegate rod, linkage, or valve position may be detected by sensor 194. In a still further example, sensor 194 may detect one or more attributes of actuator 129. Sensor 194 may measure wastegate position by measuring output from the motor of actuator 129, for example, if actuator 129 is an electronic actuator, or may measure current from the electronic actuator motor. For embodiments in which actuator 129 is a pneumatic actuator, sensor 194 may measure the current supplied to the vacuum regulator or mass airflow through the regulator and/or from the vacuum source, for example. Output from sensor 194 may be used to calculate turbine speed or turbine power, as explained below.

Similarly, products of combustion that are exhausted by engine 110 via exhaust passage 168 can be directed through exhaust turbine 134 of turbocharger 130, which in turn can provide mechanical work to compressor 132 via shaft 136 in order to provide compression to intake air flowing through the second branch of the engine's intake system. Alternatively, some or all of the exhaust gases flowing through exhaust passage 168 can bypass turbine 134 via turbine bypass passage 133 as controlled by wastegate 138. The position of wastegate 138 may be controlled by actuator 139 as directed by control system 190. In some embodiments, actuator 139 may be a pneumatic actuator configured to vary the pressure with which a wastegate valve (not shown) of wastegate 138 is acted against. By varying this pressure, and thus the force applied to the wastegate valve, the position of the wastegate valve may be selectively positioned (e.g., continuously between a fully open and a fully closed position) to control the level of gas diversion away from turbine 134 and thus the boost delivered to cylinder 20B and other cylinders in an associated bank. In this configuration, actuator 139 may include a suitable vacuum source (not shown), and optionally a vent (not shown) with which gases may be exhausted when the wastegate valve is not placed at the fully closed position. An exemplary pneumatic wastegate configuration is shown in FIG. 2 and described below.

In other embodiments, actuator 139 may be an electric motor having an output shaft coupled to a linkage (e.g., four bar, linear rod, etc.) to which the wastegate valve of wastegate 138 is also coupled. In yet other embodiments, a solenoid may be used to control the position of the wastegate valve.

A sensor 192 may be positioned on or near turbocharger 130. In one example, sensor 192 may detect turbine speed. In another example, sensor 192 may detect a position of wastegate 138. For example, one or more of a wastegate rod, linkage, or valve position may be detected by sensor 192. In a still further example, sensor 192 may detect one or more attributes of actuator 139. Sensor 192 may measure wastegate position by measuring output from the motor of actuator 139, for example, if actuator 139 is an electronic actuator, or may measure current from the electronic actuator motor. For embodiments in which actuator 139 is a pneumatic actuator, sensor 192 may measure the current supplied to the vacuum regulator or mass airflow through the regulator and/or from the vacuum source, for example. Output from sensor 192 may be used to calculate turbine speed or turbine power, as explained below.

In some examples, exhaust turbines 124 and 134 may be configured as variable geometry turbines, whereby associated actuators 125 and 135 may be used to adjust the position of the turbine impeller blades to vary the level of energy that is obtained from the exhaust gas flow and imparted to their respective compressor. For example, the control system can be configured to independently vary the geometry of the exhaust gas turbines 124 and 134 via their respective actuators 125 and 135. As explained previously, the turbochargers 120 and 130 may become imbalanced, e.g., operate at different turbine speeds or with different turbine power. In order to balance the turbochargers, the actuators 125 and 135 may be adjusted. For example, the speed of each turbocharger may be determined using turbocharger speed sensors, and if the speeds do not match, one or more of actuator 125 and actuator 135 may be adjusted until the speeds of the turbochargers match. In another example, a parameter of each of the actuators 125, 135, such as the position, force, etc., may be determined, and if the parameters are unequal, the actuators may be adjusted.

Products of combustion exhaust by one or more cylinders via exhaust passage 166 can be directed to ambient via exhaust passage 170. Exhaust passage 170 may include an exhaust aftertreatment device such as catalyst 174, and one or more exhaust gas sensors indicated at 184 and 185, for example. Similarly, products of combustion exhaust by one or more cylinders via exhaust passage 168 can be directed to ambient via exhaust passage 172. Exhaust passage 172 may include an exhaust aftertreatment device such as catalyst 176, and one or more exhaust gas sensors indicated at 186 and 187, for example. Exhaust gas sensors 184, 185, 186, and/or 187 can communicate with control system 190.

Engine system 100 can include various other sensors. For example, at least one of intake passages 142 and 144 can include a mass air flow sensor 180. In some examples, only one of intake passages 142 and 144 can include a mass air flow sensor. In still other examples, both of intake passages 142 and 144 can include a mass airflow sensor. A mass airflow sensor may include, as one example, a hot wire anemometer or other suitable device for measuring mass flow rate of the intake air. Mass airflow sensor 180 can communicate with control system 190 as shown in FIG. 1.

Control system 190 can include one or more controllers configured to communicate with the various sensors and actuators described herein. As one example, control system 190 can include at least one electronic controller comprising one or more of the following: an input/output interface for sending and receiving electronic signals with the various sensors and actuators, a central processing unit, memory such as random accessible memory (RAM), read-only memory (ROM), keep alive memory (KAM), each of which may communicate via a data bus. Control system 190 may include a proportional-integral-derivative (PID) controller in some examples. However, it should be appreciated that other suitable controllers may be used as can be appreciated by one skilled in the art in light of the present disclosure. The controller may store instructions that may be executed in order to carry one or more control routines, such as the control routine described herein with respect to FIGS. 3A and 3B.

Control system 190 can be configured to vary one or more operating parameters of the engine on an individual cylinder basis. For example, the control system can adjust valve timing by utilizing a variable cam timing (VCT) actuator, spark timing by varying the time at which the spark signal is provided to the spark plug, and/or fuel injection timing and amount by varying the pulse width of the fuel injection signal that is provided to the fuel injector by the control system. Thus, at least the spark timing, valve timing, and fuel injection timing can be actuated by the control system.

Turning now to FIG. 2, a schematic depiction of an example dual wastegate system 200 is shown. Wastegate system 200 includes two wastegates: wastegate 202A and wastegate 202B, each configured to control the amount of exhaust gas diverted from respective exhaust passages 204A and 204B (portions of which being shown in FIG. 2), and thus the amount of exhaust gas reaching respective turbocharger turbines. With respect to FIG. 1, wastegates 202A and 202B may be wastegates 138 and 128, respectively, and thus may be operable to partially control exhaust flow through exhaust passages 168 and 166, respectively. As such, wastegates 202A and 202B may control the boost delivered to cylinders 20B and 20A, respectively, and/or other cylinders in respectively associated banks, and may be implemented in a multi-turbocharger system such as that depicted in FIG. 1.

Wastegates 202A and 202B respectively include wastegate valves 206A and 206B which may be selectively positioned at a fully open position (e.g., in order to supply maximum boost), at a fully closed positioned, and continuously anywhere therebetween, relative to valve seats 208A and 208B. In some embodiments, wastegate 202A and/or wastegate 202B may include a bias (e.g., a spring coupled to a bottom surface of a wastegate valve and a portion of a proximate exhaust passage). Desired boost, based on engine operating conditions and driver-requested torque, for example, may be achieved by positioning wastegate valves 206A and 206B in this manner. To achieve desired wastegate positioning, wastegates 202A and 202B include respective wastegate sensors 210A and 210B each configured to indicate one or more properties of the wastegates. In some embodiments, wastegate sensors 210A and 210B may indicate the position of wastegate valves 206A and 206B, respectively, though other sensor configurations are possible, as described in further detail below. As shown, wastegate sensors 210A and 210B supply respective WG signals to a controller 212 indicating the position of their associated wastegate valves.

Controller 212 is a suitable controller configured to adjust the position of wastegate valves 206A and 206B based on the received WG signals described above. Controller 212 may be, or may be integrated within, control system 190 of FIG. 1, for example. In the depicted embodiment, controller 212 actuates a vacuum regulator 214, in turn varying the pressure of fluid (e.g., pressurized gasses such as air, exhaust gas, etc.) supplied to a pressure reservoir 216 via tubing 218. Disposed inside reservoir 216 are plates 220A and 220B, which are positioned such that pressure (e.g., fluidic pressure such as hydraulic or pneumatic) supplied to the reservoir acts against the plates in opposite directions (e.g., outward directions toward the left and right in FIG. 2, respectively). Plates 220A and 220B are respectively coupled to linkages 222A and 222B, which are in turn respectively coupled to wastegate valves 206A and 206B, such that outwardly-acting pressure supplied to the plates is conveyed to the wastegate valves—specifically, pressure increase in the reservoir causes both wastegate valves to move closer to their associated seats and toward the fully closed position. Conversely, decreases in the pressure supplied to reservoir 216 bring plates 220A and 220B closer to each other, in turn increasing the distance from which wastegate valves 206A and 206B are separated from their associated valve seats (e.g., increasing their respective lifts). In some embodiments, one or more biases (e.g., one for each plate 220A and 220B) may be positioned inside reservoir 216 to impose a minimum separation between the plates (and thus a maximum wastegate valve lift).

Vacuum regulator 214, and optionally additional components such as reservoir 216 and plates 220A and 220B, may be referred to as a wastegate actuator. The wastegate actuator is thus coupled to first and second wastegate valves 206A and 206B through intermediate components such as first and second linkages 222A and 222B, and links ends of the linkages (e.g., via first and second plates 220A and 220B). The wastegate actuator is thus adapted to adjust a length 225 between the linked ends, and in turn concurrently adjust respective lifts of first and second wastegate valves 206A and 206B.

Exhaust pressure acting against one wastegate valve (e.g., valve 206A) may be conveyed via its associated linkage (e.g., linkage 222A) through reservoir 216 to the opposite wastegate valve (e.g., valve 206B) and vice versa, facilitating automatic balancing of both wastegate valves by positioning the valves at substantially similar lifts (e.g., within 10%), and thus the provision of substantially equal boost (e.g., within 10%) to each bank. Such a configuration may reduce the complexity of control strategies employed to balance dual wastegates each controlled by individual actuators.

In some embodiments, at least a portion of linkage 222A and/or linkage 222B may include a variable-length arm whose length is adjustable responsive to the pressure supplied to reservoir 216. The remaining portion of linkage 222A and/or linkage 222B may be a fixed-length arm. As a non-limiting example, an arm 223A of linkage 222A may be a variable-length arm, while an arm 223B of the linkage, coupled to arm 223A, may be a fixed-length arm. In other embodiments, however, linkage 222A and/or linkage 222B may comprise fixed-length arms and not variable-length arms. For embodiments in which linkage 222A and 222B are coupled together via a common linkage (e.g., for configurations in which wastegate valves 206A and 206B are electrically-actuated), linkages 222A and 222B may comprise fixed-length arms while the common linkage may comprise a variable-length arm actuated by a suitable actuator (e.g., electric actuator such as an electric motor). In this example, the actuator may be adapted to vary the length of the variable-length arm, and further, a sensor (not shown) configured to measure the length of the variable-length arm may be provided alternatively or additionally to wastegate sensors 210A and 210B. For example, in some embodiments wastegate positioning may be based on output from the variable-length arm sensor and not the WG signals from sensors 210A and 210B.

To facilitate the variation of pressure supplied to reservoir 216 by vacuum regulator 214, a suitable vacuum source 224 is fluidically coupled to the vacuum regulator from which the regulator may draw pressurized fluid (e.g., pressurized gasses). Further, a vent 226 may also be fluidically coupled to vacuum regulator 214. With such a configuration, pressurized fluid may be selectively supplied to reservoir 216 to position wastegate valves 206A and 206B according to engine operating conditions (e.g., desired boost).

As described above, other wastegate sensor configurations are possible including those suited to the pneumatic actuator configuration illustrated in FIG. 2. For example, sensors configured to indicate the current drawn by vacuum regulator 214, mass airflow through the vacuum regulator or vacuum source 224, and/or pressure inside the vacuum regulator, vacuum source, or reservoir 216 may be provided. Such sensors may be utilized alternatively or additionally to wastegate sensors 210A and 210B described above.

Wastegate system 200 may provide various benefits relative to other wastegate systems. In particular, as a single actuator sufficiently sized for exhaust pressures in exhaust passages 204A and 204B may be used to control two wastegate valves, system 200 may utilize reduced materials at reduced cost, and employ a simpler control strategy, relative to configurations in which two actuators each coupled to respective wastegate valves are used. Further, as described above, automatic wastegate valve balancing may be facilitated by linking wastegate valves 206A and 206B to each other (e.g., pneumatically, hydraulically, via a common linkage, etc.). In this way, more balanced engine operation may be provided as more uniform levels of boost may be provided to each bank of the engine. Such automatic wastegate valve balancing may mitigate degraded wastegate/engine operation resulting from asymmetry between the engine banks and hysteresis, for example.

Wastegate system 200 also affords flexibility in the physical configuration of its components. Namely, one or more components (e.g., linkages 222A and/or 222B, reservoir 216, tubing 218, vacuum regulator 214, vacuum source 224, vent 226, etc.) of system 200 may either be placed in a static, fixed location in a non-moving configuration, or may be unanchored, flexible, and moving. In the latter example, the one or more unanchored components may be flexibly (e.g., slidingly) coupled to respective rails to facilitate their flexible motion. As such, rail system 228 is shown as being positioned proximate reservoir 216. To accommodate such potential flexibility in wastegate system 200, tubing 218 may be flexible. As such, length 225, the variable length linking the ends of first and second linkages 222A and 222B, may have a variable center position 229, which may be considered a relative position of the linkage ends.

In some embodiments, rail system 228 may be positioned in a fixed manner relative to the frame of a surrounding body of a vehicle (represented together as 231) or other fixed component of the vehicle. In this way, rail system 228 may remain in a static position but support floating positioning of components (e.g., reservoir 216) constrained to the rail system such that the components can move along the rail (e.g., undergo translational motion such as motion along left and right directions along length 225 in FIG. 2).

It will be appreciated that numerous variations of wastegate system 200 are possible and within the scope of this disclosure. For example, wastegate systems in which wastegate valves 206A and 206B are hydraulically actuated are contemplated. In this example, variation in the pressure of hydraulic fluid supplied to reservoir 216 controls linkages 222A and 222B and thus the position of wastegate valves 206A and 206B in an analogous manner to the pneumatic configuration described above (e.g., increases in hydraulic fluid supplied to the reservoir push plates 220A and 220B outward, reducing the separation between wastegate valves 206A and 206B and their respective valve seats, while decreases in hydraulic fluid supplied to the reservoir bring the plates closer together, increasing the lift of the wastegate valves). However, vacuum regulator 214, vacuum source 224, and vent 226 may be replaced with components suited for hydraulic operation—for example, a hydraulic regulator, hydraulic fluid source, and an optional hydraulic vent, respectively.

In yet other embodiments, wastegate valves 206A and 206B may be commonly actuated by an electric actuator (e.g., an electric motor). Here, the electric actuator may comprise two output shafts respectively coupled to plates 220A and 220B such that actuation of the output shafts alters the positioning of wastegate valves 206A and 206B relative to one another, with the electric actuator motor adapted to float relative to the rail, similar to the pneumatic system described above. More particularly, the electric actuator may be a linear motor in which the stator of the motor is coupled to a first linkage (e.g., linkage 222A) or plate (220A) and the rotor is coupled to a second linkage (e.g. 222B) or plate (220B). Alternatively, the electric motor may be a rotary motor having a worm gear to convert rotational motion to linear motion. In either case, vacuum regulator 214, vacuum source 224, and vent 226 may be omitted, and sensors, alternatively or additionally to wastegate sensors 210A and 210B may be suited to the electrically-actuated configuration. Specifically, one or more sensors configured to sense the current supplied to the electric actuator and/or the position of one or both output shafts may be provided.

Other modifications to wastegate system 200 are possible. For example, linkage 222A and/or linkage 222B may assume other forms than those depicted in FIG. 2, including but not limited to those of four-bars or linear rods.

FIGS. 3A & 3B show a flowchart illustrating a method 300 for controlling a turbocharger associated with the twin wastegate system 200 of FIG. 2. Method 300 may be executed by a control system (e.g., control system 190 of FIG. 1) and utilized to control dual turbochargers via a wastegate system (e.g., wastegate system 200 of FIG. 2). Vacuum regulator 214 (in combination with vacuum source 224, reservoir 216, and optionally vent 226) may be particularly used to actuate wastegates 202A and 202B for embodiments in which the wastegates are pneumatically-actuated. Alternatively, a hydraulic regulator or an electric actuator may be used to actuate the wastegates for embodiments in which the wastegates are hydraulically and electrically-actuated, respectively. The vacuum regulator (or hydraulic regulator or electric actuator) is referred to herein as the "wastegate actuator" for simplicity. In one example, a method of controlling the turbocharger via the wastegate system may comprise determining a desired boost pressure and an actual boost pressure. The wastegate actuator may be adjusted according to a difference between the desired boost pressure and the actual boost pressure.

At 302 the method includes determining a desired boost according to driver demand and engine operating conditions. The assessed conditions may include engine coolant temperature, engine oil temperature, mass airflow (MAF), manifold pressure (MAP), boost, engine speed, idle speed, barometric pressure, a driver-demanded torque (for example, from a pedal position sensor, air temperature, vehicle speed, etc.).

Next, at 304, an actual boost pressure is determined. The actual boost may be directly measured from one or more sensors. In some embodiments, the actual boost may be directly measured from two sensors configured to indicate boost in respective engine banks. Alternatively, a single measurement of the actual boost pressure may be determined based on manifold pressure, as, in some configurations such as the one shown in FIG. 1, the turbochargers may be configured such that compressed intake air routed through each compressor is directed to a common intake air passage and manifold before being split to two separate engine banks. In either case, the measurement may be sent to the control system and stored thereon. In an alternative embodiment, the actual boost pressure may be estimated based on other operating parameters, such as based on MAP and RPM, for example.

Next, at 306, atmospheric pressure is determined. For example, atmospheric pressure may be measured from the MAP sensor at engine start-up, and/or estimated based on operating conditions of the engine, including MAF, MAP, throttle position, etc. The measurement may be sent to the control system and stored thereon. In an alternative embodiment, the atmospheric pressure may be estimated based on other operating parameters.

Next, at 308, a difference between the actual and desired boost is determined. The control system may determine the difference, for example. In some examples, the difference may be determined by subtracting the desired boost from the actual boost.

Next, at 310, a wastegate valve lift is determined in order to reduce the difference between the actual and desired boost determined at 308. In some examples, determining the wastegate valve lift may include determining a wastegate valve lift for each wastegate valve and suitably averaging the two to form a single averaged wastegate valve lift. In some examples, the difference between the actual and desired boost, in addition to the current wastegate valve lift (e.g., the current lifts of both wastegate valves or an average thereof), is fed to a suitable control mechanism configured to determine a wastegate valve lift in order to reduce this difference. For example, the wastegate valve lift may be used as an input to wastegate dynamics. In some wastegate actuators, the wastegate valve lift may be mapped to a wastegate duty cycle, where the duty cycle signal is generated by the controller (e.g., controller 212) and sent to the wastegate actuator. Mapping to a wastegate duty cycle may include using lookup tables or calculating the wastegate duty cycle. In some other actuators, the wastegate controller determines the duty cycle based on the difference between the desired and actual wastegate positions. A wastegate control (WGC) signal may include pulse width modulation via the wastegate duty cycle to adjust the wastegate. The wastegate valve lift may be achieved by feed-forward, feedback, and/or other control algorithms, for example.

A compensation term may account for delays of the wastegate actuator. Additionally, the compensation term may further include adjustments based on movement of twin independent cams, which can affect boost pressure. For example, as the intake cam is moved in a way that would increase boost pressure relative to atmospheric pressure, the magnitude of the compensation term may be decreased. Likewise, as the intake cam is moved in a way that would decrease boost pressure relative to atmospheric pressure, the magnitude of the compensation term may be increased.

Next, at 312, a desired actuator state is determined to achieve the wastegate valve lift determined at 310. The actuator state may correspond to a variety of parameters that may depend on the configuration of the wastegate actuator and wastegate system. For example, for embodiments in which the wastegate valves are pneumatically or hydraulically-actuated, the desired actuator state may be a desired reservoir pressure. Alternatively, for embodiments in which the wastegate valves are electrically-actuated, the desired actuator state may be a desired actuator position (e.g., output shaft position) or orientation (e.g., rotational orientation of a rotating component in the actuator). The desired actuator state (e.g., pressure, position, etc.) may be fed as an input to various suitable control mechanisms including those described above.

Next, at 314 of the method, current is applied to the actuator to achieve the desired actuator state. As described above, the desired actuator state may be a desired reservoir pressure, position, orientation, etc. A suitable voltage-to-current conversion mechanism may convert a voltage generated by the control system to generate the current. The actuator state is thus controlled based on the desired actuator state. While current is shown as being used as a control signal to actuate the wastegate actuator, it will be appreciated that other control signals may be used without departing from the scope of this disclosure, including but not limited to pneumatic or hydraulic pressure for embodiments in which the actuator is pneumatic and hydraulic, respectively.

Next, at 316 of the method, it is determined whether the actuator state is equal to the desired actuator state. In some embodiments, differences between the current actuator state and the desired actuator state below a threshold may be ignored. If the actuator state is not equal to the desired actuator state (NO), the method returns to 314. If the actuator state is equal to the desired actuator state (YES), the method proceeds to 318.

At 318 of method 300, the current applied to the actuator is adjusted to maintain the desired valve lift and the actuator state. The desired valve lift may be maintained via feedback and/or feed-forward control algorithms. For example, valve lift may be controlled via an inner control loop. Thus, the applied current is adjusted when the actuator state reaches a state corresponding to a desired wastegate valve position.

At 320 of method 300, the actuator pressure may be optionally measured for embodiments in which the wastegate actuator is a pneumatic or hydraulic actuator. Measurement of the actuator pressure may include measuring the pressure of pneumatic or hydraulic fluid in a vacuum regulator (e.g., regulator 214 of FIG. 2) or hydraulic regulator and/or in a pressure reservoir (e.g., reservoir 216), depending on available sensors. Such measurement may provide information regarding actual exhaust pressure, which may used for boost control.

Thus, as shown and described, method 300 may be used to position two wastegate valves via a single, common actuator according to desired boost, among other factors. Method 300 may facilitate dual wastegate control without significantly increasing complexity relative to control routines used to control a single wastegate, and may reduce complexity relative to other control routines used to control two wastegate actuators each configured to position respective wastegate valves. Moreover, complexity in dual wastegate control routines introduced due to the desire to correct imbalances between the wastegates may be obviated in method 300 when combined with a wastegate system such as system 200 of FIG. 2, as the common coupling (e.g., hydraulic, pneumatic, physical linkage, etc.) of the wastegates may automatically correct such imbalance.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a multi-turbocharger system, comprising: concurrently adjusting lifts of a first wastegate valve of a first turbocharger and a second wastegate valve of a second turbocharger, separate from the first turbocharger, by adjusting a length between linkage ends of the first and second wastegate valves via a common actuator, the length including a variable center position which varies relative to a vehicle body frame depending on relative positions of the linkage ends, and the actuator floating relative to the vehicle body frame, the first wastegate valve coupled to the actuator through a first plate via a first linkage and the second wastegate valve coupled to the actuator through a second plate via a second linkage.

2. The method of claim 1, wherein the actuator is slidingly coupled to a rail system, the actuator undergoing translational motion along the rail system, the rail system fixed to the vehicle body frame.

3. The method of claim 2, wherein the actuator changes relative positions of the linkage ends by moving the linkage ends in opposite directions.

4. A twin turbocharger system, comprising:
a first turbocharger comprising a first wastegate having a first valve;
a second turbocharger comprising a second wastegate having a second valve;
a wastegate actuator coupled to the first and second valves through a first plate and a second plate via respective linkages, the first plate and the second plate being attached at respective ends of the linkages and being positioned in a reservoir; the actuator linking the ends of the linkages and adjusting a length between the first plate and the second plate by varying a pressure of one of a fluid or gases within the reservoir, a center position of the length varying relative to a vehicle body frame depending on relative positions of the plates.

5. The twin turbocharger system of claim 4, wherein the wastegate actuator is an electric actuator comprising an electric motor.

6. The twin turbocharger system of claim 4, wherein the wastegate actuator is a pneumatic actuator.

7. The twin turbocharger system of claim 6, wherein the wastegate actuator is coupled to the first valve through a first plate and to the second valve through a second plate, and wherein the pneumatic actuator comprises a vacuum regulator configured to draw pressurized gases from a vacuum source, the vacuum regulator fluidically coupled to the reservoir and configured to vary a position of the first and second plates responsive to a desired boost.

8. The twin turbocharger system of claim 4, wherein the wastegate actuator is a hydraulic actuator.

9. The twin turbocharger system of claim 8, wherein the wastegate actuator is coupled to the first valve through a first plate and to the second valve through a second plate, and wherein the hydraulic actuator comprises a hydraulic regulator configured to draw pressurized fluid from a fluid source, the hydraulic regulator fluidically coupled to the reservoir and configured to vary a position of the first and second plates responsive to a desired boost.

10. A system, comprising:
a first wastegate comprising a first wastegate valve;
a second wastegate comprising a second wastegate valve; and
a wastegate actuator coupled to each of the first and second wastegate valves to vary openings of the first wastegate valve and the second wastegate valve according to desired boost,
wherein the first wastegate valve is coupled to the wastegate actuator through a first plate via a first linkage and the second wastegate valve is coupled to the wastegate actuator through a second plate via a second linkage, the first and second plates disposed inside a reservoir, the reservoir configured such that increased fluidic pressure supplied to the reservoir pushes the first and second plates outwardly, decreasing respective lifts of the first wastegate valve and the second wastegate valve, the reservoir configured such that decreased fluidic pressure supplied to the reservoir brings the first and second plates closer together, increasing the respective lifts of the first wastegate valve and the second wastegate valve.

11. The system of claim 10, wherein the first wastegate valve and the second wastegate valve are coupled to the wastegate actuator through an arm via respective linkages, the wastegate actuator adapted to move the arm.

12. The system of claim 11, wherein the respective linkages each comprise a fixed-length arm.

13. The system of claim 10, wherein the reservoir is configured to receive a hydraulic fluid from a hydraulic regulator via tubing, the hydraulic regulator fluidically coupled to a hydraulic fluid source.

14. The system of claim 10, wherein the reservoir is configured to receive pressurized gases from a vacuum regulator via tubing, the vacuum regulator fluidically coupled to a vacuum source.

15. The system of claim 14, wherein the vacuum regulator is fluidically coupled to a vent.

16. The system of claim 10, wherein the reservoir is slidingly coupled to a rail system.

17. The system of claim 10, wherein the first wastegate and the second wastegate comprise a wastegate system, the wastegate system configured to balance the first and second wastegate valves by conveying exhaust pressure acting against the first wastegate valve to the second wastegate valve, and exhaust pressure acting against the second wastegate valve to the first wastegate valve, via one of a common linkage and a pressure reservoir.

18. The system of claim 17, wherein the first and second wastegate valves are positioned at substantially similar lifts by conveying exhaust pressure between the first and second wastegate valves via one of the common linkage and the pressure reservoir.

* * * * *